United States Patent [19]

Saleem et al.

[11] Patent Number: 5,362,458
[45] Date of Patent: Nov. 8, 1994

[54] PROCESS FOR THE SIMULTANEOUS ABSORPTION OF SULFUR OXIDES AND PRODUCTION OF AMMONIUM SULFATE

[75] Inventors: Abdus Saleem, Leola; Eli Gal, Lititz; Gregory Brown, Palmyra; Michael Mengel, Fredericksburg, all of Pa.

[73] Assignee: General Electric Environmental Services, Incorporated, Lebanon, Pa.

[21] Appl. No.: 35,284

[22] Filed: Mar. 22, 1993

[51] Int. Cl.$^5$ .......................... C01B 17/00; C01C 1/24
[52] U.S. Cl. .......................... 423/243.06; 423/243.03; 423/545; 423/547
[58] Field of Search .................. 423/243.03, 243.06, 423/545, 547

[56] References Cited

U.S. PATENT DOCUMENTS

| | | | |
|---|---|---|---|
| T909,017 | 4/1973 | Jordan et al. | 423/243.06 |
| 1,986,889 | 1/1935 | Fulton | 423/547 |
| 2,233,841 | 3/1941 | Lepsoe | 423/547 |
| 2,862,789 | 12/1958 | Burgess | 423/243.06 |
| 3,186,802 | 6/1965 | Gerrard | 423/547 |
| 3,676,059 | 7/1972 | Welty, Jr. | 423/243.06 |
| 3,843,789 | 10/1974 | Spector et al. | 423/243.06 |
| 3,983,217 | 9/1976 | Muraki et al. | 423/545 |
| 4,039,304 | 8/1977 | Bechthold | 423/243.06 |
| 4,213,945 | 1/1980 | Haese et al. | 423/545 |
| 4,250,160 | 2/1981 | Eakman | 423/547 |
| 4,268,489 | 5/1991 | Haese | 423/547 |
| 4,325,713 | 4/1982 | Rosenberg et al. | 423/243.06 |
| 4,430,303 | 2/1984 | Linde | 422/170 |
| 4,690,807 | 9/1987 | Saleem | 423/545 |

FOREIGN PATENT DOCUMENTS

| | | | |
|---|---|---|---|
| 52-7870 | 1/1977 | Japan | 423/243.06 |
| 57-121387 | 7/1982 | Japan . | |

OTHER PUBLICATIONS

Hüvel, The Ammonia Wet Scrubbing Desulphurizaton Process Combined With A Denox-Stage, International Symposium on Improved Technology For Fossil Power Generation, Washington, D.C. (EPRI), Mar. 1-3, 1993.

Primary Examiner—Gary P. Straub
Attorney, Agent, or Firm—Finnegan, Henderson, Farabow, Garrett & Dunner

[57] ABSTRACT

Process for the removal of sulfur oxides from sulfur oxide-containing gas with simultaneous production of ammonium sulfate. The process is carried out by first passing hot sulfur oxide-containing gas through a pre-scrubber wherein the gas contacts saturated aqueous ammonium sulfate liquor which is recycled in the pre-scrubber, followed by passing the prescrubbed gas through an absorber wherein the prescrubbed gas contacts dilute aqueous ammonium sulfate liquor. The sulfur oxide in the sulfur oxide-containing gas is absorbed by the dilute aqueous ammonium sulfate liquor in the absorber, and scrubbed gas is removed from the absorber. The dilute aqueous ammonium sulfate liquor is treated with ammonia and air and the absorbed sulfur dioxide is converted to ammonium sulfate in the liquor. The dilute ammonium sulfate liquor is recycled into contact with the prescrubbed gas in the absorber. Dilute aqueous ammonium sulfate liquor is removed from the absorber and added to the saturated aqueous ammonium sulfate liquor in the prescrubber where it becomes saturated due to evaporation caused by the hot gas. Ammonium sulfate crystals form in the saturated aqueous ammonium sulfate liquor in the prescrubber are recovered as product from saturated aqueous ammonium sulfate withdrawn from the prescrubber.

13 Claims, 3 Drawing Sheets

PROCESS FOR THE SIMULTANEOUS ABSORPTION OF SULFUR OXIDES AND PRODUCTION OF AMMONIUM SULFATE

BACKGROUND OF THE INVENTION

The present invention relates to an improved process for the removal of sulfur oxides from sulfur oxide-containing gases, and more particularly, to an improved process for the simultaneous absorption of sulfur dioxide and production of ammonium sulfate from gas containing sulfur dioxide.

Sulfur dioxide emission control from such sources as fossil fuel fired boilers, smelters, sulfuric acid plants, pulp and paper mill operations and the like is required by law in many countries to mitigate the serious environmental and health damage that is associated with sulfur dioxide. The most widely practiced method for sulfur dioxide control is based upon limestone or lime contact with flue gases in the form of aqueous slurry. In most instances, the by-product is either discarded as a land fill or converted into gypsum for use in wall board and cement manufacture. In a few instances, other alkaline reagents, such as sodium compounds, magnesium compounds and ammonia have been used with recovery of useful by-products, such as pure sulfur dioxide, sulfuric acid and sulfur.

Ammonia and ammoniacal scrubbing solutions are also well known for flue gas desulfurization. In U.S. Pat. No. 4,690,807, which is incorporated herein by reference in its entirety, gases containing at least one sulfur oxide are treated with aqueous ammonia, and ammonium sulfate is produced in a single vessel which includes an absorption tower and liquor reservoir. The sulfur oxide gas or gases are removed from gases containing sulfur oxides by contact of the gas with an aqueous solution of ammonium sulfate. As the sulfur oxide gas, such as sulfur dioxide, is absorbed by the ammonium sulfate solution, it becomes acidic. The acidic solution in U.S. Pat. No. 4,690,807 is neutralized by injection of ammonia into the ammonium sulfate solution to maintain a desired pH level sufficient to prevent excessive ammonia loss. An oxidizing medium, such as air, is injected into the neutralized ammonium sulfate solution containing the absorbed sulfur oxide gas, leading to the formation of ammonium sulfate. The ammonium sulfate product can be withdrawn as a suspension of ammonium sulfate crystals, as a saturated solution and/or as a less-than-saturated solution. In U.S. Pat. No. 4,690,807, recovered ammonium sulfate can be further recrystallized and/or dewatered and dried for ease of handling and storage.

It is generally known that in processes dependent on oxidation rate, the higher the oxidation rate, the more economical the process. It has been determined that the rate of oxidation of ammonium sulfite/bisulfite formed by absorption of sulfur dioxide in ammonium sulfate liquor and reaction with ammonia, is dependent upon the concentration of ammonium sulfate in the liquor and that the rate of oxidation decreases with increasing concentration. Although sulfur dioxide removal from flue gas and simultaneous ammonium sulfate production in the system and process of U.S. Pat. No. 4,690,807 is efficient, it is always desirable and advantageous to improve efficiency in the scrubbing of gases. Thus, it would be advantageous to provide a process and apparatus for the removal of sulfur oxides from gases with the simultaneous production of ammonium sulfate wherein the rate of oxidation is increased by decreasing the concentration of the ammonium sulfate used to absorb the sulfur oxide gases.

SUMMARY OF THE INVENTION

To achieve these and other advantages and in accordance with the purpose of the invention, as embodied and broadly described herein, there is provided an improved process and system for the removal of sulfur oxides from gas containing sulfur oxides. The efficiency of sulfur oxide removal from flue gas has been improved by absorption of sulfur dioxide and oxidation of ammonium sulfite in a dilute ammonium sulfate solution or liquor. The resultant dilute ammonium sulfate liquor is evaporated in a prescrubbing vessel to produce a saturated aqueous ammonium sulfate liquor containing suspensions of ammonium sulfate crystals.

Hot flue gas containing sulfur dioxide, and optionally containing HCl and HF, is contacted with saturated aqueous ammonium sulfate liquor in a prescrubber vessel which provides intimate contact of hot flue gas with saturated aqueous ammonium sulfate liquor. The prescrubber vessel is fed with dilute aqueous ammonium sulfate liquor from a sulfur dioxide absorption vessel. The hot flue gas is cooled and saturated with water vapor in the prescrubber vessel. When HCl or HF are present, they are also removed in the prescrubber. The pH of the prescrubber liquor is low (e.g., pH of about 0.5 to 3.0) and therefore little sulfur dioxide is removed in the prescrubber.

After removing entrained liquor droplets in a demister, the cooled gas is introduced into a sulfur dioxide absorption vessel in which sulfur dioxide is removed from the gas with dilute aqueous ammonium sulfate liquor. The absorbed sulfur dioxide is reacted with ammonia in the liquor to form ammonium sulfite which is oxidized by injected oxygen-containing gas, preferably air, to form ammonium sulfate. Ammonia is introduced into the liquor with oxidizing air or the ammonia and air can be injected separately. The sulfur dioxide absorber vessel provides intimate contact between sulfur dioxide bearing gas and dilute aqueous ammonium sulfate liquor.

In accordance with the present invention, a hot gas containing a sulfur oxide is contacted with a saturated aqueous ammonium sulfate liquor containing suspended ammonium sulfate crystals in a prescrubber vessel to evaporate water by adiabatically cooling the gas stream thereby producing additional ammonium sulfate crystals and a prescrubbed gas containing sulfur oxide and water vapor. Any HCl and/or HF in the sulfur oxide-containing gas stream is removed in the prescrubber. The saturated aqueous ammonium sulfate liquor through which the gas containing sulfur oxide has passed, is collected in a prescrubber reservoir. The saturated aqueous ammonium sulfate liquor through which the hot gas containing sulfur oxide is passed in the prescrubber vessel, is saturated aqueous ammonium sulfate liquor recycled from the prescrubber reservoir, and saturated aqueous ammonium sulfate liquor having ammonium sulfate crystals suspended therein is removed from the prescrubber reservoir for recovery of ammonium sulfate product.

The prescrubbed gas containing sulfur oxide and water vapor is passed through a demister to remove entrained saturated aqueous ammonium sulfate liquor and ammonium sulfate crystals suspended therein. The prescrubbed gas containing sulfur oxide and water vapor is passed from the demister and contacted with dilute aqueous ammonium sulfate liquor in a sulfur oxide absorber to produce a dilute aqueous ammonium sulfate liquor having sulfur oxide absorbed therein and a scrubbed gas. The dilute aqueous ammonium sulfate having sulfur oxide gas absorbed therein is collected in an absorber reservoir. Ammonia is introduced into the dilute ammonium sulfate liquor having sulfur oxide gas absorbed therein and an oxygen-containing gas is introduced into the dilute aqueous ammonium sulfate liquor having sulfur oxide absorbed therein in the absorber reservoir whereby ammonium sulfate is formed in the dilute ammonium sulfate liquor contained in the absorber reservoir by the reaction of the absorbed sulfur oxide gas with the ammonia and the oxygen in the oxygen-containing gas. The dilute aqueous ammonium sulfate which the prescrubbed gas containing sulfur oxide contacts in the sulfur oxide absorber, is formed from dilute aqueous ammonium sulfate liquor recycled from the absorber reservoir, and scrubbed gas is withdrawn from the sulfur oxide absorber.

In certain aspects of the present invention, ammonium sulfate crystals are separated from the saturated aqueous ammonium sulfate liquor having ammonium sulfate crystals suspended therein after the liquor is removed from the prescrubber reservoir, and optionally, the saturated aqueous ammonium sulfate liquor from which ammonium sulfate crystals have been removed is recycled to the prescrubber and/or the prescrubber reservoir. In another aspect of the present invention, a bleed stream of saturated aqueous ammonium sulfate solution is optionally removed from the prescrubber and treated for removal of impurities, chlorides and/or fluorides either captured from the gas or present as reaction products from other components contained in the gas. In other aspects of the present invention, make-up dilute ammonium sulfate solution from the absorber reservoir is added to the saturated aqueous ammonium sulfate liquor in the prescrubber, and optionally, dilute aqueous ammonium sulfate liquor withdrawn from the absorber reservoir is used to wash the demister between the prescrubber and the absorber before it is added to the saturated aqueous ammonium sulfate liquor. In another aspect of the present invention make-up water is added to the dilute aqueous ammonium sulfate liquor in the absorber.

As used herein, sulfur oxides are generally referred to, for the sake of convenience, as sulfur dioxide. The sulfur oxide gas may also contain other components including gases which react with ammonium sulfate, e.g., hydrogen chloride, hydrogen fluoride and the like and mixtures thereof.

The ammonium sulfate product can be used as a fertilizer directly or mixed with other fertilizers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate the invention and, together with the description, serve to explain the advantages and principles of the invention. In the drawings.

DETAILED DESCRIPTION OF THE INVENTION

Figure 1:
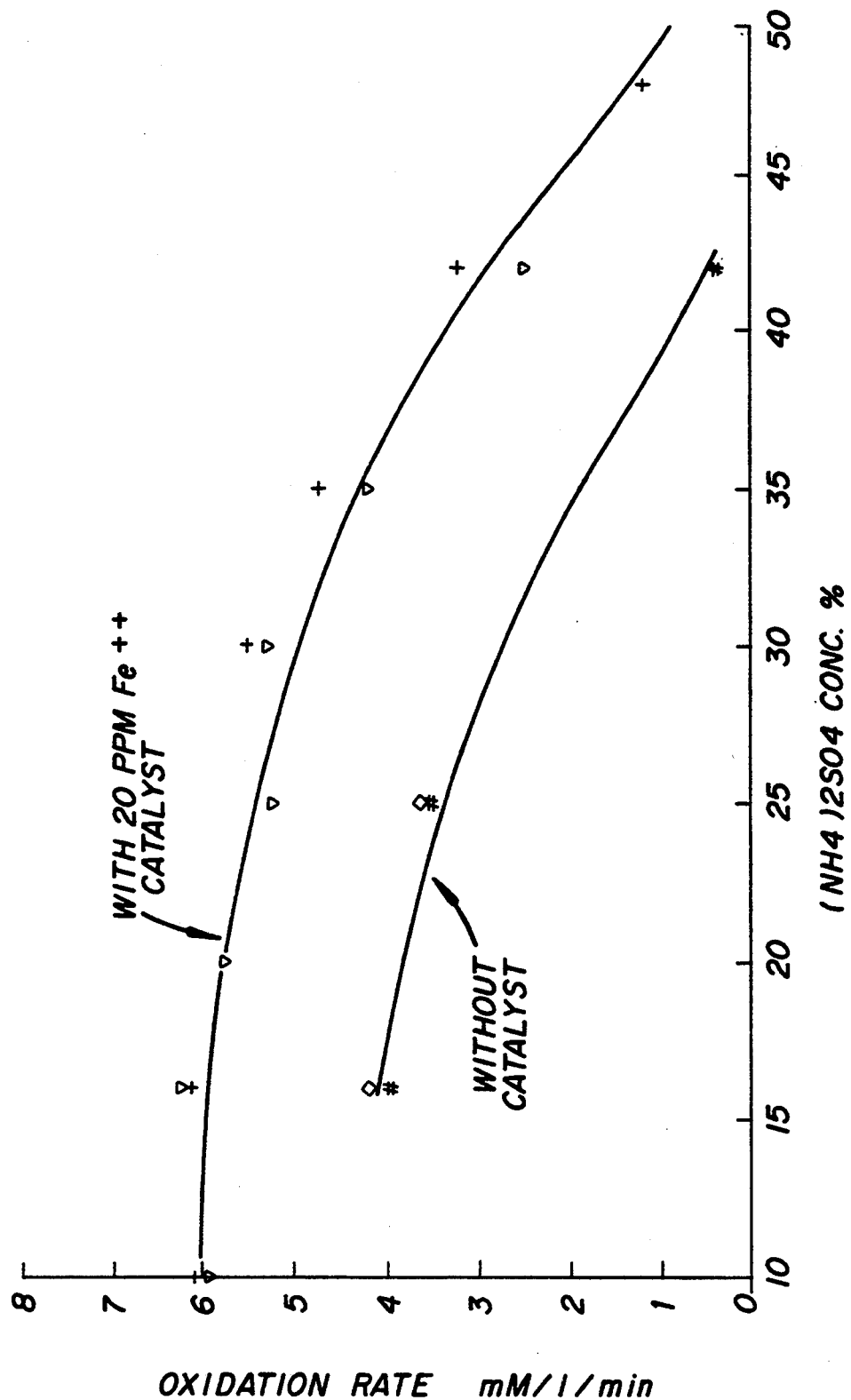
FIG. 1 is a graphical representation of oxidation rate of ammonium sulfite versus ammonium sulfate concentration in solution.

In the present invention, gases containing at least one sulfur oxide are treated in a sulfur oxide absorber (absorption vessel) for the removal of the sulfur oxide therefrom by contacting them with a spray, mist (in the form of droplets) or other suitable form of dilute aqueous ammonium sulfate to form an aqueous ammonium sulfate having sulfur oxides absorbed therein and a scrubbed gas. The dilute aqueous ammonium sulfate having the sulfur oxides absorbed therein is collected in a reservoir, generally referred to herein as an absorber reservoir. Ammonia is introduced into the dilute aqueous ammonium sulfate having sulfur oxide gas absorbed therein. The ammonia may be introduced into the aqueous ammonium sulfate at various points in the absorber, but preferably in the absorber reservoir and/or in the system which circulates or recycles the dilute aqueous ammonium sulfate liquor from the absorber reservoir to the dilute aqueous ammonium sulfate scrubbing zone in the absorption vessel. The ammonia reduces the acidity of the dilute aqueous ammonium sulfate liquor having sulfur dioxide absorbed therein. The dilute aqueous ammonium sulfate liquor treated with ammonia and having reduced acidity is referred to herein as neutralized dilute aqueous ammonium sulfate liquor.

An oxidizing gas, generally, an oxygen-containing gas, such as air is introduced into the dilute aqueous ammonium sulfate liquor having sulfur dioxide absorbed therein in the absorber reservoir whereby ammonium sulfate is formed in the reservoir by the reaction of the absorbed sulfur oxide gas with the ammonia and with the oxygen in the oxygen-containing gas.

The dilute aqueous ammonium sulfate with which the gases containing sulfur oxides are contacted in the sulfur oxide absorber, is formed from dilute aqueous ammonium sulfate liquor removed (recycled) from the absorber reservoir and circulated by suitable means, such as pumps, through suitable conduits, such as pipes. Scrubbed gas is withdrawn from the sulfur oxide absorber and dilute aqueous ammonium sulfate from the sulfur oxide absorber is collected in the absorber reservoir from which it is withdrawn and fed to a prescrubber as make-up ammonium sulfate liquor. The dilute aqueous ammonium sulfate liquor becomes saturated due to the evaporation of water in the prescrubber.

Prior to introducing the gas into the sulfur oxide absorber for the removal of the sulfur oxide therefrom, the gas is prescrubbed in a prescrubber vessel which adiabatically cools the gas stream ultimately resulting in the production of a concentrated or saturated aqueous ammonium sulfate liquor having ammonium sulfate crystals suspended therein due to evaporation of water in the saturated aqueous ammonium sulfate liquor. Hot gas containing sulfur oxide is contacted with a spray, mist (in the form of droplets) or other suitable form of saturated aqueous ammonium sulfate in the prescrubber vessel and a cooled prescrubbed gas containing sulfur oxide and water vapor are withdrawn from the prescrubber vessel and passed through a prescrubber demister to remove entrained aqueous saturated ammonium sulfate liquor containing crystals therefrom, prior to passing the prescrubbed gas containing sulfur oxide and water vapor to the sulfur oxide absorber. Thus, because of the removal of water vapor in the prescrubbed gas stream, the prescrubber concentrates the saturated aqueous ammonium sulfate liquor causing crystallization of ammonium sulfate and the formation of a saturated aqueous ammonium sulfate solution having ammonium sulfate crystals suspended therein in the prescrubber.

The saturated aqueous ammonium sulfate liquor having ammonium sulfate crystals suspended therein is collected in a reservoir, generally referred to herein as a prescrubber reservoir.

The saturated aqueous ammonium sulfate with which the hot flue gases containing sulfur oxides are contacted in the prescrubber vessel, is formed from saturated aqueous ammonium sulfate liquor having ammonium sulfate crystals suspended therein removed (recycled) from the prescrubber reservoir and circulated by suitable means, such as pumps, through suitable conduits, such as pipes. Saturated aqueous ammonium sulfate liquor from which water vapor has been removed by contact with the hot gas, is collected in the prescrubber reservoir from which it is withdrawn as saturated aqueous ammonium sulfate having ammonium sulfate crystals suspended therein and ammonium sulfate crystals may be recovered as a product.

The saturated aqueous ammonium sulfate liquor may be agitated in the area of the withdrawal zone by any suitable agitating means such as one or several stirrers. By agitating the saturated aqueous ammonium sulfate solution in the withdrawal zone, a slurry of ammonium sulfate crystals is maintained in the saturated aqueous ammonium sulfate liquor and the deposition of ammonium sulfate crystals is prevented in the bottom of the prescrubber reservoir. The saturated aqueous ammonium sulfate liquor having ammonium sulfate crystals suspended therein can be removed from the withdrawal zone by any suitable manner, such as by a pump or by gravity removal means located at or near the bottom of the prescrubber reservoir. Any crystals contained in the saturated aqueous ammonium sulfate liquor can be easily removed for example, by filtration. Furthermore, the product can be classified, re-crystallized and/or dewatered and dried for ease of handling and storage.

In one aspect of the present invention, the saturated aqueous ammonium sulfate liquor having ammonium sulfate crystals suspended therein is passed from the prescrubber to a classifier; coarse crystals of ammonium sulfate are separated from the liquor in the classifier; and the liquor containing crystals of ammonium sulfate having a particle size smaller than the coarse crystals is recycled to the prescrubber vessel or the prescrubber reservoir.

Although there is no particular limit on the size of the particles separated in the classifier, e.g., a hydroclone, and one skilled in the art can readily choose the desired size of ammonium sulfate crystals which are separated from the saturated aqueous ammonium sulfate liquor having ammonium sulfate crystals suspended therein. Although there is no intention to be limited herein by the particular size of the ammonium sulfate crystals separated from the liquor, coarse crystals may generally be defined as those having a size greater than, e.g. about 300 microns. Naturally, as used herein, the liquor containing crystals of ammonium sulfate having a particle size smaller than the coarse crystals, i.e., containing crystals which are smaller than, e.g., about 300 microns, can be recycled to the prescrubber vessel or the prescrubber reservoir.

The process of the present invention is easily carried out in a continuous mode. Flue gas or any other sulfur oxide-containing gas from any other source, preferably having dust and other particulates removed therefrom, is introduced into the prescrubber and is directed in a co-current flow with the flow of the saturated aqueous ammonium sulfate liquor. The cooled, prescrubbed gas exits the prescrubber vessel through a prescrubber demister, is introduced in a continuous mode into the sulfur oxide absorption vessel where it is directed countercurrent to the flow of the dilute aqueous ammonium sulfate liquor. Scrubbed gas flows continuously from the absorption vessel and is removed by appropriate means, e.g., through a stack, preferably after the scrubbed gas is passed through a demister to remove dilute aqueous ammonium sulfate liquor therefrom. Generally, the gas is moved continuously through the system by the use of one or more fans, e.g., inducted gas fans.

While the gas continuously passes through the prescrubber and the absorber, the respective liquors therein continuously recycle in the form of a spray, mist or other form suitable to provide intimate contact between the gas and the liquor in the respective vessel and dilute aqueous ammonium sulfate liquor can be continuously withdrawn from the absorber and fed to the prescrubber while saturated aqueous ammonium sulfate having ammonium sulfate crystals therein is continuously withdrawn from the prescrubber.

Figure 3:
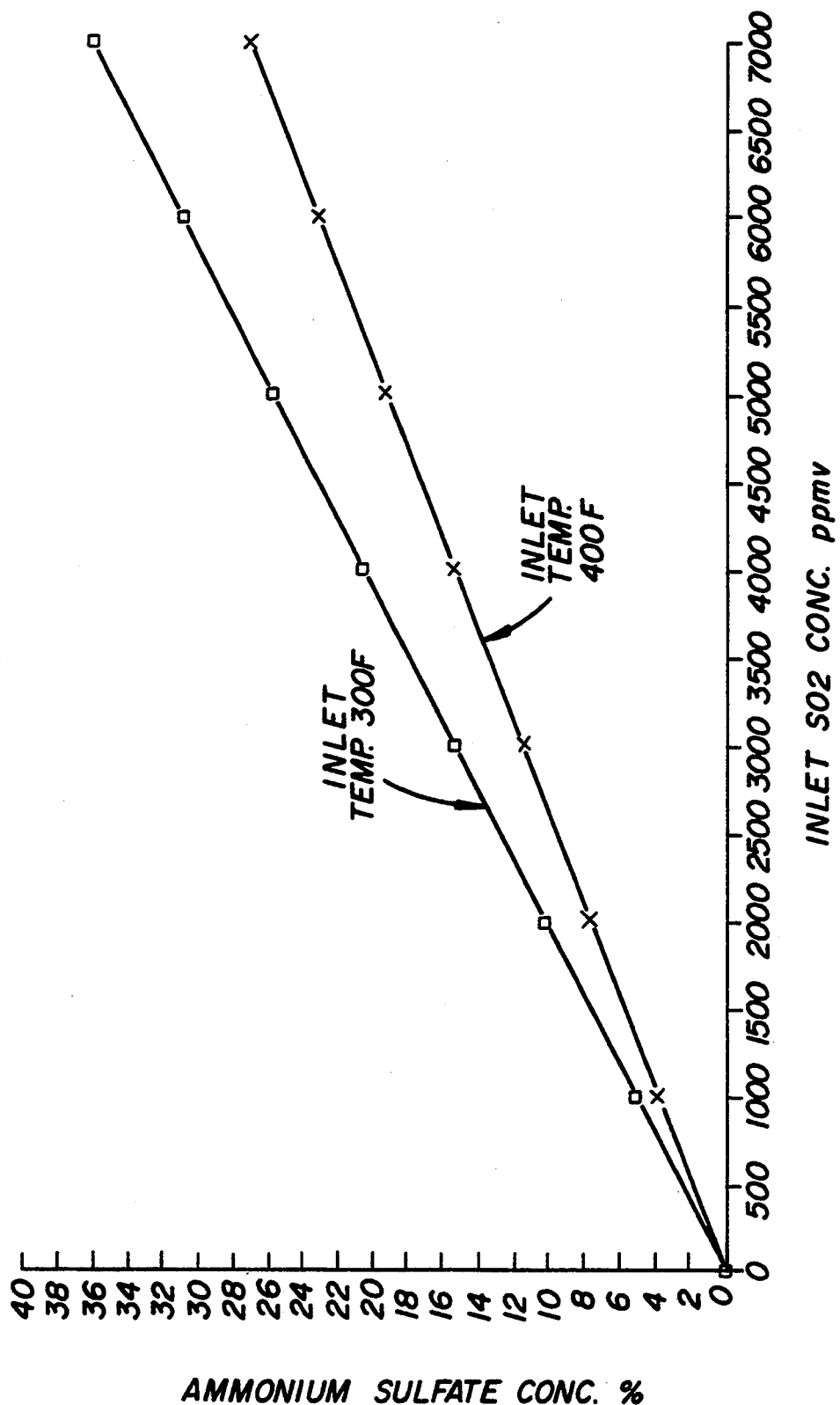
FIG. 3 is a graphical representation of inlet gas sulfur dioxide concentration versus ammonium sulfate concentration in a sulfur dioxide absorber at two different inlet gas temperatures.

Liquor levels are maintained in the prescrubber vessel and reservoir and in the sulfur oxide absorption vessel and reservoir by any suitable means. In one aspect of the invention, the liquor level in the prescrubber vessel and/or reservoir tends to drop due to evaporation of water and withdrawal of the product liquor containing ammonium sulfate crystals. To counter this tendency and to maintain constant liquor level in the prescrubber vessel, an appropriate amount of dilute aqueous ammonium sulfate solution is withdrawn from the absorber reservoir and added to the prescrubber reservoir. Since this withdrawal tends to lower the liquor level in the absorber reservoir, an appropriate amount of make-up water is added to the absorber vessel or absorber reservoir to maintain a constant liquor level. The exact concentration of ammonium sulfate that can be maintained in the $SO_2$ absorption vessel is a function of the amount of $SO_2$ absorbed and oxidized to ammonium sulfate and the amount of water added to the absorber vessel. Since the amount of water added to the absorber vessel is equal to the amount of liquor withdrawn and added to the prescrubber vessel to make up for losses due to evaporation, the controlling factor for the amount of permissible water is the evaporation rate. The evaporation rate is a function of the temperature of the hot gas entering the prescrubber vessel. FIG. 3 shows the effect of $SO_2$ concentration and gas temperature on concentration of ammonium sulfate that can be maintained in the absorber vessel liquor.

Make-up water is preferably added to the absorber vessel via the absorber demister in the absorption vessel where it washes any deposits on the absorber demister blades and then falls into the absorber vessel. Similarly, the dilute aqueous ammonium sulfate liquor withdrawn from the absorber vessel is first used to wash the prescrubber demister before it is added to the prescrubber vessel as make-up liquor.

In the process of the present invention, it is critical that the aqueous ammonium sulfate liquor in both the absorber vessel and the absorber reservoir be maintained as a dilute aqueous ammonium sulfate liquor to improve the oxidation efficiency of the sulfur dioxide absorbed in the fluid. This is achieved by removing dilute aqueous ammonium sulfate liquor from the absorber and adding make-up water thereto, thereby maintaining a dilute concentration of the ammonium sulfate in the absorber liquor which results in maximum or near maximum oxidation of sulfur dioxide, e.g., as determined from the graph in FIG. 1. As shown in FIG. 1, testing in an aqueous ammonium sulfate solution of ammonium sulfite/bisulfite demonstrated that oxidation rate is dependent upon the concentration of ammonium sulfate in the liquor. As seen in FIG. 1, as the concentration of ammonium sulfate approaches saturation, e.g., above about 40% by weight of ammonium sulfate in the aqueous liquor, the oxidation rate in mM/l/minute is substantially reduced. The present invention provides a process for sulfur dioxide absorption and rapid oxidation in dilute aqueous ammonium sulfate solution in an absorber unit with concentration of the dilute ammonium sulfate liquor in a prescrubber unit.

In the process of the present invention, generally the saturated aqueous ammonium sulfate liquor will contain about 45% to about 50% by weight ammonium sulfate in water and dilute aqueous ammonium sulfate solution will generally contain less than the amount of ammonium sulfate required for saturation. However, in preferred embodiments of the present invention, dilute aqueous ammonium sulfate solution or liquor contains about 35% by weight or less ammonium sulfate in water. Although there is no lower limit on the concentration of dilute aqueous ammonium sulfate solution or liquor, generally, there is little or no advantage in using a dilute aqueous ammonium sulfate liquor having a concentration less than about 5%, more preferably about 15%, by weight ammonium sulfate in water. In the most preferred embodiments of the present invention, the dilute aqueous ammonium sulfate liquor is maintained at a concentration of about 10% to 35% by weight ammonium sulfate in water.

In the prescrubber reservoir, there is a tendency of the saturated aqueous ammonium sulfate liquor to become supersaturated which allows the growth of ammonium sulfate crystals and as indicated above, these crystals are removed either continuously or intermittently, from the saturated aqueous ammonium sulfate liquor as desired. Thus, the prescrubber reservoir functions as a vessel for the growth of ammonium sulfate crystals and for the desupersaturation of ammonium sulfate liquor.

As indicated above, the hot flue gas may also contain hydrogen chloride and/or hydrogen fluoride gases. If these gases are present in the hot sulfur oxide-containing flue gas, they are removed in the prescrubber vessel and form ammonium salts. These salts can either be removed with the ammonium sulfate product or separately removed by taking a bleed stream of ammonium sulfate liquor from the prescrubber.

Generally, the apparatus of the present invention for the simultaneous removal of sulfur oxide gas from hot sulfur oxide-containing gases and production of ammonium sulfate includes a prescrubber unit or tower with an appropriate prescrubber reservoir associated therewith and a sulfur oxide absorption unit or tower having an appropriate absorption reservoir associated therewith. The prescrubber reservoir has an ammonium sulfate product withdrawal zone. A dust collector or other particulate removal means is usually positioned upstream of the prescrubber vessel. Means are provided for passing gas from the dust collector to the prescrubber vessel and from the prescrubber vessel to the sulfur oxide absorption vessel or tower having means for the removal of scrubbed gas. Means are provided for passing dilute aqueous ammonium sulfate liquor from the absorber reservoir to the prescrubber reservoir and for adding make-up water to the absorber unit.

The prescrubber unit may be any appropriate design which will permit the scrubbing of hot sulfur oxide gases with a saturated aqueous ammonium sulfate liquor, and includes a prescrubber vessel, a prescrubber reservoir, a prescrubber demister, means for bleeding or withdrawing saturated aqueous ammonium sulfate liquor having ammonium sulfate crystals suspended therein from the prescrubber reservoir, means for introducing dilute aqueous ammonium sulfate solution, means for contacting a gas with saturated ammonium sulfate liquor in the prescrubber, means for recycling saturated aqueous ammonium sulfate liquor from the prescrubber reservoir to contact the gas in the prescrubber, means for flowing hot sulfur oxide-containing gas in a direction cocurrent with the flow of saturated aqueous ammonium sulfate liquor in the prescrubber and means for stirring or agitating the saturated aqueous ammonium sulfate liquor in the prescrubber reservoir. The prescrubber vessel and prescrubber reservoir may be a single unit having the prescrubber reservoir positioned in the bottom of a prescrubber vessel or the prescrubber reservoir may be a separate vessel or tank from the prescrubber vessel and connected thereto by appropriate means to permit the flow of saturated aqueous ammonium sulfate solution from the prescrubber vessel to the prescrubber reservoir, preferably by gravity.

The absorber unit may be any appropriate design which will permit the absorption of sulfur oxide gases in a dilute aqueous ammonium sulfate liquor in intimate contact therewith, e.g., in the form of a spray or mist, and includes an absorber vessel which communicates with an absorber reservoir to permit the flow of dilute aqueous ammonium sulfate solution from the absorber vessel to the absorber reservoir, means for contacting a gas with dilute aqueous ammonium sulfate solution in the absorber vessel, means for recycling dilute aqueous ammonium sulfate liquor from the absorber reservoir to contact the gas in the absorber, means for passing gas which enters the absorber vessel in a direction countercurrent to the direction of the flow of the dilute aqueous ammonium sulfate liquor, means for removing dilute aqueous ammonium sulfate liquor from the absorber reservoir, an absorber demister for removing dilute aqueous ammonium sulfate liquor from scrubbed gas, means for injecting ammonia and/or aqueous ammonia and air into the absorber reservoir, means for removing the scrubbed gas from the absorber vessel and means for adding make-up water to the absorber unit. The absorber vessel and absorber reservoir may be a single unit or may be separate units which communicate with each other to permit the flow of dilute aqueous ammonium sulfate solution, preferably by gravity, from the absorber vessel to the absorber reservoir.

Figure 2:
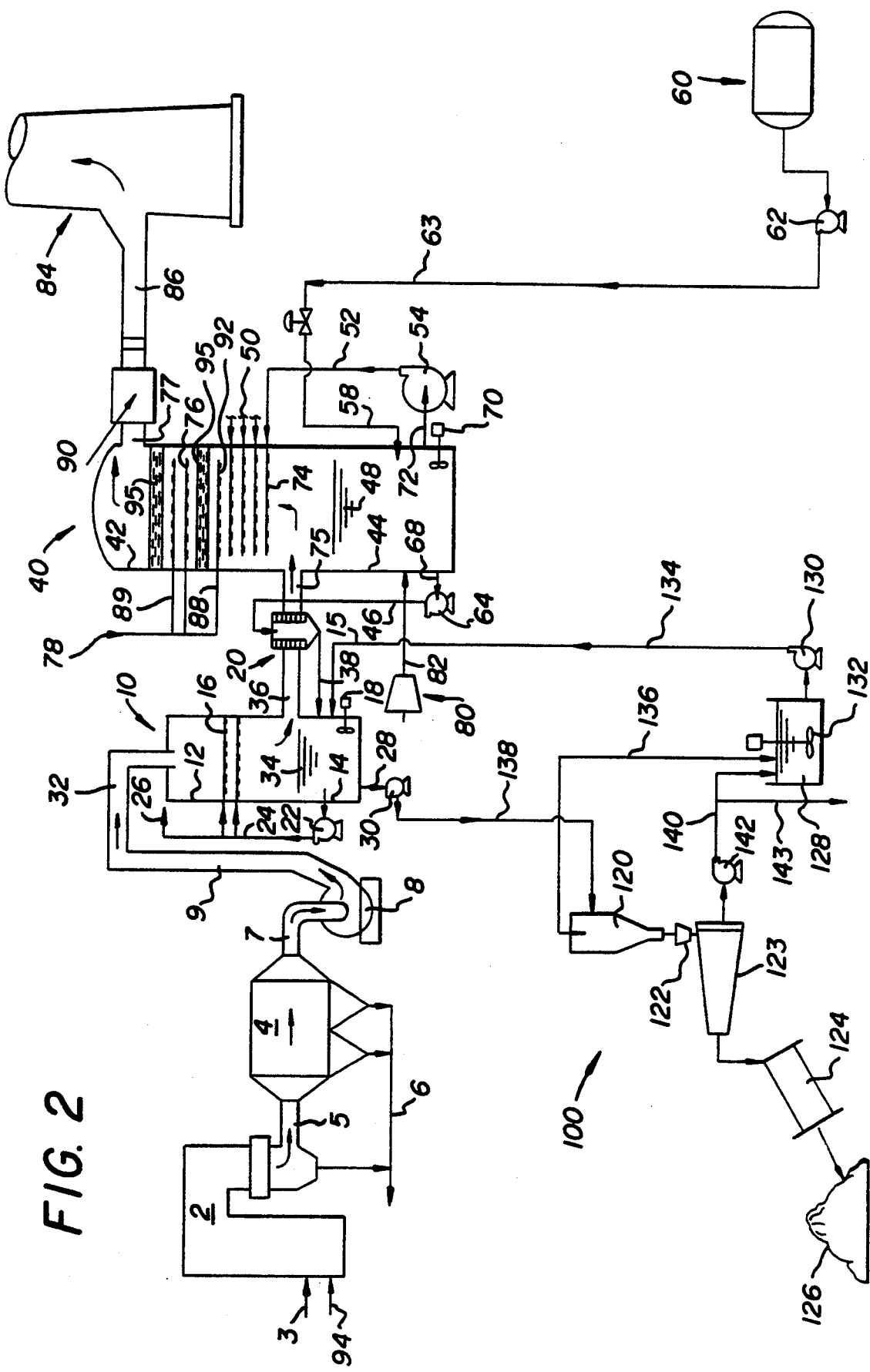
FIG. 2 depicts in schematic form a sulfur dioxide source, a sulfur dioxide prescrubber, an ammonium sulfate crystal separator, a sulfur dioxide absorption unit and scrubbed gas disposal.

Referring to FIG. 2, a hot gas stream containing sulfur dioxide gas is generated by boiler 2 which is supplied by fuel from a source 3 and air 94. The hot sulfur dioxide gas passes from boiler 2 through appropriate flue gas duct 5 to dust collector 4 where particulate matter is removed in a manner well known in the art, e.g., a cyclone separator and/or a bag house, and ash is removed through appropriate hoppers at recovery unit 6. The hot sulfur dioxide containing gas having dust particles removed therefrom passes through gas duct 7 to inducted gas fan 8 which propels the gas through the system. The hot sulfur dioxide containing gas passes from fan 8 through gas duct 9 and into prescrubber 10 through gas duct 32.

Prescrubber 10 has an upper section 12 which is defined herein as prescrubber vessel 12 and a lower section 14 which is defined herein as prescrubber reservoir 14. Prescrubber reservoir 14 contains saturated aqueous ammonium sulfate liquor 34 which is removed from prescrubber reservoir 14 by pump 22 through suitable conduit 24 and recycled as a spray or mist by spray means 16 located in prescrubber vessel 12. Conduit 26 distributes recycled saturated aqueous ammonium sulfate liquor to a distributor (not shown) which continuously flushes the interior walls of the prescrubber vessel 12 with a prescrubber wall wash-down stream of liquor to prevent build-up of solid matter and deposits on the walls of the vessel. Spray means 16 propels the saturated aqueous ammonium sulfate solution 34 into prescrubber vessel 12 in a direction which is co-current with the flow of hot sulfur dioxide gas which enters prescrubber 10 at gas duct 32 and exits prescrubber 10 at gas duct 36.

The hot sulfur dioxide containing flue gas, generally at a temperature of about 200° F. (93° C.) to 400° F. (204° C.), is adiabatically cooled in prescrubber vessel 12. The cooling is at a constant temperature and the latent heat of evaporation absorbs the heat from the hot sulfur dioxide containing gas and the temperature remains constant. Water from the saturated aqueous ammonium sulfate liquor becomes water vapor in the hot sulfur dioxide containing gas and the sulfur dioxide containing gas exits prescrubber 10 as a cooled prescrubbed gas which contains sulfur dioxide and water vapor among other constituents. The evaporation of the water from the saturated aqueous ammonium sulfate solution concentrates the aqueous ammonium sulfate liquor causing the formation of ammonium sulfate crystals in the liquor. The saturated aqueous ammonium sulfate solution having ammonium sulfate crystals suspended therein collects in prescrubber reservoir 14 and is recycled by pump 22 through conduit 24 into spray means 16 in the upper portion 12 of prescrubber 10 as described above. The temperature of the prescrubbed sulfur dioxide containing gas as it exits prescrubber 10 is about 110° F. to 150° F. Prescrubbed flue gas in gas duct 36 passes through prescrubber demister 20 where entrained saturated aqueous ammonium sulfate liquor containing ammonium sulfate crystals suspended therein is removed from the prescrubbed gas and the liquor and suspended crystals are recycled through appropriate conduit 38 into prescrubber reservoir 14.

The prescrubbed gas passing from prescrubber demister 20 passes through gas duct 75 into absorber 40 where sulfur dioxide is removed from the gas by absorption.

Absorber 40 has an upper portion identified herein as absorber vessel 42 and a lower portion 44 identified herein as absorber reservoir 44. Absorber reservoir 44 contains dilute aqueous ammonium sulfate liquor 48. Flue gas enters absorber 40 through gas duct 75 at the lower portion of absorber vessel 42 but above the liquid level of dilute aqueous ammonium sulfate liquor 48.

Dilute aqueous ammonium sulfate liquor 48 is recycled by means of pump 54 from absorber reservoir 44 through conduit 72 and is passed through conduits 52 and 50 into absorber spray means 74 where the dilute aqueous ammonium sulfate liquor forms a mist or spray which passes in a direction in absorber vessel 42 which is countercurrent to the flow of the prescrubbed gas stream which enters the absorber 40 at gas duct 75 and exits absorber 40 at gas duct 77 as scrubbed gas.

The dilute aqueous ammonium sulfate liquor absorbs the sulfur dioxide and the dilute aqueous ammonium sulfate liquor having the sulfur dioxide absorbed therein passes to absorber reservoir 44, preferably by gravity, where it accumulates in the reservoir and is recycled from absorber reservoir 44 to absorber spray means 74.

In absorber 40, ammonia gas from source 60 passes by a suitable pump 62 through conduits 63 and 58 into absorber reservoir 44. Simultaneously, a source of oxygen, e.g., air, from source 80 passes into absorber reservoir 44 through conduit 82. The reaction of the absorbed sulfur dioxide in dilute aqueous ammonium sulfate liquor 48 with the ammonia and the air results in the formation of ammonium sulfate.

Dilute aqueous ammonium sulfate 48 is removed through conduit 68 from absorber reservoir 44 by means of pump 64 through conduit 46 into prescrubber demister 20 and subsequently passes through conduit 38 into prescrubber reservoir 14 where it provides make-up liquid caused by the loss through evaporation and withdrawal of product in prescrubber 10. As dilute aqueous ammonium sulfate liquor is removed from absorber reservoir 44, make-up water is added to absorber 40 from a source 78 through conduits 88 and 89 where it is sprayed by respective spray means 92 and 76 into absorber vessel 42. Water entering absorber vessel 42 through these conduits is preferably used in conjunction with mist eliminator 95, i.e., absorber demister 95. Scrubbed gas exits from absorber 40 at gas duct 77 and may pass through an optional gas reheater 90 and then through gas duct 86 into stack 84 where the scrubbed gas is discharged to the atmosphere.

Prescrubber reservoir 14 is equipped with one or more stirrers 18 and absorber reservoir 44 is equipped with one or more stirrers 70 to maintain agitation of the liquor in the respective reservoirs.

Although it is not shown, prescrubber reservoir 14 can be a separate tank or unit from prescrubber vessel 12 and absorber reservoir 44 can be a separate unit or tank from absorber vessel 42 as long as appropriate means are provided for the flow of the liquors from the vessels to the respective reservoirs.

Saturated aqueous ammonium sulfate liquor having ammonium sulfate crystals suspended therein can be subjected to various means which separate the ammonium sulfate crystals from the saturated aqueous ammonium sulfate liquor when it is removed from prescrubber reservoir 14 through conduit 28. As shown in FIG. 2, pump 30 is used to pass the liquor containing ammonium sulfate crystals through conduit 138 to product recovery unit 100. The liquor containing ammonium sulfate crystals passes into a primary dewatering device, e.g., a hydroclone 120. Hydroclone 120 and underflow 122 containing the bulk of ammonium sulfate crystals is further dewatered in a centrifuge 123 which produces ammonium sulfate crystal cake containing about 2% moisture. The cake is then fed into a compactor/granulator (not shown) followed by a dryer 124 or directly into a dryer 124 to produce dry ammonium sulfate product. The dried ammonium sulfate product 126 is stored while the saturated aqueous ammonium sulfate liquor containing fine particles and crystals passes through conduit 136 to recycle tank 128. Liquor removed at centrifuge unit 123 passes through conduit 140 into recycle tank 128 by the action of pump 142. Optionally, a small bleed stream 143 can be withdrawn to purge any impurities from the system. As desired, the saturated aqueous ammonium sulfate liquor maintained in an agitated state by stirrer 132 in recycle tank 128 is removed therefrom by pump 130 and passes through conduits 134 and 15 into prescrubber reservoir 14 where it is added to the saturated aqueous ammonium sulfate liquor 34 having ammonium sulfate crystals suspended therein.

Air is injected into the dilute aqueous ammonium sulfate liquor in absorber reservoir 44 by any suitable air injection system, e.g., an air sparger arranged in a network of perforated pipes (not shown) as well known in the art and as described in U.S. Pat. No. 4,690,807.

As described in detail above, the pH is maintained in absorber reservoir 44 to decrease the acidity of the sulfur dioxide absorbed in the dilute aqueous ammonium sulfate liquor. The pH of the dilute aqueous ammonium sulfate liquor in the absorber is generally maintained at about 5 to 6 and more preferably at about 5.2 to 5.8. The ammonia, preferably injected in the form of gaseous ammonia is injected in absorber reservoir 44 by any suitable system well known in the art, e.g., by a sparger arranged in a network of perforated pipes (not shown) as described in U.S. Pat. No. 4,690,807.

The following specific examples describe the process of the present invention. They are intended for illustrative purposes only and should not be construed as limiting the present invention.

EXAMPLE 1

This example does not illustrate the process of the present invention but merely describes how the data was obtained for the graph of FIG. 1 which has been described in detail above.

The experiments were carried out on a bench scale as a study to determine why the oxidation rate of prior art processes was variable, and in certain cases, below the rate of oxidation generally expected.

Aqueous solutions, with 20 ppm iron as ferrous ion catalyst and without catalyst, having various ammonium sulfate concentrations were placed in several beakers. Sodium sulfite at various concentrations was added to the aqueous ammonium sulfate solutions (starting with 10,000 ppm sulfite) and the pH was adjusted with sulfuric acid to a pH of 5. The temperature was maintained at 130° F. (54° C.). Air was bubbled into the beaker and the rate at which the sodium sulfite disappeared was established for each sample. The data obtained for these experiments is shown in FIG. 1 and has been discussed above.

EXAMPLES 2–7

The examples described below were carried out in a pilot plant size absorber as shown in FIG. 2. The source of the flue gas was from a breaching of a boiler duct, and sulfur dioxide levels were increased by the use of a sulfur dioxide tank appropriately metered and connected to the flue gas duct work.

Using an aqueous ammonium sulfate solution in the apparatus of FIG. 2, the sulfur dioxide removal efficiency was compared at various sulfur dioxide concentrations shown in the table below in parts per million (PPM). In Case I, six operating spray banks 74 were used in absorber vessel 42 and in Case II, four operating spray banks 74 were used in absorber vessel 42. The pH of the dilute aqueous ammonium sulfate liquor 48 used in absorber 40 is shown in Case II in the table below. The amount of ammonium sulfite present in the aqueous ammonium sulfate liquor 48 is also shown in the table below.

TABLE

| EXAMPLE | SO₂ REMOVAL EFFICIENCY USING AMMONIA | | |
|---|---|---|---|
| | CASE I: 6 OPERATING SPRAY BANKS | | |
| | SO$_2$ CONC. PPM | SULFITE = 0 PPM % EFFICIENCY | |
| 2 | 2000 | 97–98.5 | |
| 3 | 3700 | 96–97 | |
| 4 | 6100 | 93–94.5 | |
| | CASE II: 4 OPERATING SPRAY BANKS | | |
| | SO$_2$ CONC. PPM | pH = 5.5 SULFITE = 500–9000 PPM % EFFICIENCY | pH = 5.8 SULFITE = 11600 PPM % EFFICIENCY |
| 5 | 2000 | 99.8 | — |
| 6 | 3700 | 95 | — |
| 7 | 6100 | 95.8 | 99.8 |

From the data in the Table, it can be seen that the sulfur dioxide removal efficiencies are very high when the process of the present invention is utilized using ammonia in the absorber. As seen in the above table, sulfur dioxide removal efficiency varies with sulfur dioxide concentration. Furthermore, sulfite (in the form of ammonium sulfite) in the liquor significantly increases removal efficiency. There was low ammonia slip of 0–3 ppm at a pH range of 5.2–5.8. There was no increase in opacity during operation. The ammonium sulfate product isolated as (crystals) from the process had a purity greater than 99.5% with a moisture content of less than 1.2% and 90% of the particles crystals had a particle size greater than 300 microns.

It will be apparent to those skilled in the art that various modifications and variations can be made in the

What is claimed is:

1. A process for improving the absorption rate and oxidation rate of sulfur oxide contained in a hot gas, wherein the hot gas containing sulfur oxide first contacts a saturated aqueous ammonium sulfate liquor in a prescrubber vessel to evaporate water by adiabatically cooling the gas, to produce a saturated aqueous ammonium sulfate liquor having ammonium sulfate crystals suspended therein, and to produce a prescrubbed gas containing sulfur oxide and water vapor; wherein the saturated aqueous ammonium sulfate liquor having ammonium sulfate crystals suspended therein collects in a prescrubber reservoir and is recycled from the prescrubber reservoir to the prescrubber vessel crystals suspended therein is removed from the prescrubber reservoir; and wherein the prescrubbed gas containing sulfur oxide and water vapor is passed through a demister to remove entrained aqueous saturated ammonium sulfate liquor containing ammonium sulfate crystals therefrom; the improvement comprising:

(a) contacting the prescrubbed gas containing sulfur oxide and water vapor from the demister with dilute aqueous ammonium sulfate in a sulfur oxide absorber to produce a dilute aqueous ammonium sulfate liquor having sulfur oxide absorbed therein and a scrubbed gas;

(b) collecting in an absorber reservoir the dilute aqueous ammonium sulfate liquor having sulfur oxide gas absorbed therein;

(c) introducing ammonia into the dilute ammonium sulfate liquor having sulfur oxide gas absorbed therein;

(d) introducing an oxygen-containing gas into the dilute aqueous ammonium sulfate liquor having sulfur oxide absorbed therein in the reservoir whereby ammonium sulfate product is formed by rapid oxidation in the dilute aqueous ammonium sulfate liquor in the reservoir by the reaction of the absorbed sulfur oxide gas with the ammonia and the oxygen in the oxygen-containing gas;

(e) contacting the dilute aqueous ammonium sulfate solution recycled from the absorber reservoir with the prescrubbed gas containing sulfur oxide in the sulfur oxide absorber; and (f) withdrawing scrubbed gas.

2. The process of claim 1, further comprising adding make-up aqueous ammonium sulfate solution to the prescrubber vessel from dilute aqueous ammonium sulfate liquor withdrawn from the absorber reservoir.

3. The process of claim 2, wherein the dilute aqueous ammonium sulfate liquor withdrawn from the absorber reservoir is fed to the demister from the absorber reservoir prior to addition to the prescrubber vessel.

4. The process of claim 1, further comprising adding make-up water to the absorber.

5. The process of claim 1, further comprising removing crystals of ammonium sulfate from the saturated ammonium sulfate liquor having ammonium sulfate crystals suspended therein.

6. The process of claim 5, wherein the saturated ammonium sulfate liquor is recycled to the prescrubber vessel or the prescrubber reservoir.

7. The process of claim 1, further comprising passing the saturated aqueous ammonium sulfate liquor having ammonium sulfate crystals suspended therein from the prescrubber to a classifier, separating coarse crystals of ammonium sulfate from the liquor and recycling the liquor containing crystals of ammonium sulfate having a particle size smaller than the coarse crystals to the prescrubber vessel or the prescrubber reservoir.

8. The process of claim 1, wherein the sulfur oxide is sulfur dioxide.

9. The process of claim 1, wherein the oxygen-containing gas is air.

10. The process of claim 1, wherein the amount of ammonia introduced into the dilute aqueous ammonium sulfate liquor is an amount sufficient to reduce the acidity of the aqueous ammonium sulfate having sulfur oxide absorbed therein and thereby form a neutralized dilute aqueous ammonium sulfate liquor.

11. The process of claim 1, further comprising passing the scrubbed gas through a demister to remove entrained dilute ammonium sulfate liquor droplets therefrom.

12. The process of claim 1, wherein the hot gas introduced into the prescrubber contains HCl, HF or mixtures thereof which are removed in the prescrubber.

13. The process of claim 1, wherein the concentration of ammonium sulfate in the dilute aqueous ammonium sulfate liquor is maintained at a concentration of 5% to 35% by weight, based on the total weight of the liquor.

* * * * *